(12) United States Patent
Nam

(10) Patent No.: US 7,616,241 B2
(45) Date of Patent: Nov. 10, 2009

(54) COLOR IMAGE SENSING DEVICE AND PIXEL DATA READING METHOD THEREOF

(75) Inventor: Jung-Hyun Nam, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 555 days.

(21) Appl. No.: 11/360,374

(22) Filed: Feb. 23, 2006

(65) Prior Publication Data

US 2006/0227228 A1  Oct. 12, 2006

(30) Foreign Application Priority Data

Feb. 23, 2005  (KR)  .................... 10-2005-0015040

(51) Int. Cl.
  *H04N 5/335*  (2006.01)
(52) U.S. Cl. ...................... 348/272; 348/308
(58) Field of Classification Search ................ 348/272, 348/273, 274, 260–324
  See application file for complete search history.

(56) References Cited

U.S. PATENT DOCUMENTS

| | | | | |
|---|---|---|---|---|
| 5,475,425 A * | 12/1995 | Przyborski et al. | ......... | 348/239 |
| 6,522,356 B1 * | 2/2003 | Watanabe | ............... | 348/272 |
| 6,538,696 B2 * | 3/2003 | Hieda et al. | ................ | 348/317 |
| 6,661,457 B1 * | 12/2003 | Mathur et al. | ............... | 348/273 |
| 6,833,868 B1 * | 12/2004 | Meynants et al. | .......... | 348/272 |
| 6,885,396 B1 * | 4/2005 | Panicacci et al. | ........... | 348/241 |
| 7,005,628 B2 * | 2/2006 | Rossi | .................... | 250/214 A |
| 7,133,073 B1 * | 11/2006 | Neter | ........................ | 348/272 |
| 7,242,428 B2 * | 7/2007 | Decker et al. | .............. | 348/272 |
| 7,277,128 B2 * | 10/2007 | Miyahara | ................... | 348/249 |
| 7,433,547 B2 * | 10/2008 | Yamamoto | ................. | 382/309 |
| 7,456,866 B2 * | 11/2008 | Hirose | ..................... | 348/222.1 |
| 2002/0154231 A1 * | 10/2002 | Decker et al. | .............. | 348/302 |
| 2004/0257451 A1 * | 12/2004 | Yamamoto | ............ | 348/207.99 |

(Continued)

FOREIGN PATENT DOCUMENTS

JP  07236147  5/1995

(Continued)

OTHER PUBLICATIONS

English Abstract.

*Primary Examiner*—Tuan V Ho
*Assistant Examiner*—Don Nguyen
(74) *Attorney, Agent, or Firm*—F. Chau & Associates, LLC

(57) ABSTRACT

A color image sensing device that includes an APS array, a plurality of column selectors, a plurality of analog-digital converters, and a signal processor. The APS array includes a first plurality of column arrays in which a first plurality of red pixels and a first plurality of green pixels are alternately arranged and a second plurality of column arrays in which a second plurality of green pixels and a second plurality of blue pixels are alternately arranged. The plurality of column selectors are disposed on both sides of the APS array. The plurality of analog-digital converters convert pixel data output from the column selectors into digital data. The signal processor receives pixel data output from the analog-digital converters, sums up at least one pixel data representing the same color and outputs the summed data in response to an output mode.

10 Claims, 10 Drawing Sheets

U.S. PATENT DOCUMENTS

2006/0238621 A1 * 10/2006 Okubo et al. .......... 348/208.99

FOREIGN PATENT DOCUMENTS

| JP | 01156281 | 8/2001 |
| JP | 2001-292453 | 10/2001 |
| KR | 20010101290 | 11/2001 |
| KR | 20040086804 | 10/2004 |

* cited by examiner

_US 7,616,241 B2_

COLOR IMAGE SENSING DEVICE AND PIXEL DATA READING METHOD THEREOF

CROSS-REFERENCE TO RELATED PATENT APPLICATION

This application claims priority to Korean Patent Application No. 10-2005-0015040, filed on Feb. 23, 2005, the disclosure of which is herein incorporated by reference in its entirety.

BACKGROUND OF THE INVENTION

1. Field of the Invention

The present invention relates to a color image sensing device, and more particularly to a CIS (CMOS image sensor) type color image sensing device capable of summing up pixel data representing the same color and outputting the summed pixel data, and a pixel data reading method thereof.

2. Description of the Related Art

A color image sensing device converts an image into an electric signal and transmits the image to a screen. Color image sensing devices typically include a digital still camera for reproducing a still image and a camcorder for reproducing a moving image.

Color image sensing devices having an image sensor for converting light into an electric signal can be classified into CCD (Charge Coupled Device) types and CIS (Contact Image Sensor) types depending on the type of the image sensor. The CCD type image sensing devices are designed for a wide range of color image sensing applications and include a CCD image sensor. The CCD image sensor converts external light into an electric signal using a plurality of MOS (Metal Oxide Semiconductor) capacitors arranged on a semiconductor substrate. The CIS type image sensing device includes a CMOS (Complementary Metal Oxide Semiconductor) image sensor that converts photogenerated charge to voltage inside each pixel using a plurality of CMOS transistors formed on a semiconductor substrate.

FIG. 1 is a block diagram of a conventional image sensing device 101. Referring to FIG. 1, the color image sensing device 101 includes an APS (Active Pixel Sensor) array 111, a row driver 121, first and second data processors 131 and 132, and a multiplexer 141. The APS array 111 includes a plurality of column arrays 111a through 111h and vertical transfer lines 115. When the row driver 121 addresses the pixels R11 through G88, data is output from the addressed pixels. As shown in FIG. 1, data output from the column arrays 111a, 111c, 111e and 111g is transmitted to the second data processor 132 and data output from the column arrays 111b, 111d, 111f and 111h is transmitted to the first data processor 131. The first and second data processors 131 and 132 amplify the data as input thereto, convert the amplified data into digital data and transmit the digital data to the multiplexer 141. The multiplexer 141 receives separate digital data streams from the first and second data processors 131 and 132 and combines them into one data stream.

FIG. 2 illustrates an arrangement of pixels from which data is read when the color image sensing device 101 of FIG. 1 is operated in a moving image mode. Referring to FIG. 2, the data of neighboring four pixels is grouped together and read when the color image sensing device 101 is operated in the moving image mode.

In a megapixel color image sensing device 101, the data read from the pixels R11 through G88 can be output to reproduce an image with high resolution in a still image mode. When the color image sensing device 101 is operated in the moving image mode, an image can be reproduced with low resolution to obtain a smooth moving image.

To reproduce a smooth moving image when the color image sensing device 101 is operated in the moving image mode, a method of skipping pixels at a predetermined rate can be used when the pixels are addressed, as shown in FIG. 2. In this case, however, the device performance can be degraded by the aliasing noise as a result of the narrow spatial sampling window, the reduced optical efficiency and poorer S/N ratio.

SUMMARY OF THE INVENTION

The present invention provides a color image sensing device capable of summing up pixel data representing the same color and outputting the summed pixel data and a pixel data reading method thereof.

According to an aspect of the present invention, there is provided a color image sensing device including an active pixel sensor (APS) array, a plurality of column selectors, a plurality of analog-digital converters, and a signal processor. The APS array includes a first plurality of column arrays in which a first plurality of red pixels and a first plurality of green pixels are alternately arranged in vertically spaced columns and a second plurality of column arrays in which a second plurality of green pixels and a second plurality of blue pixels are alternately arranged in vertically spaced columns. The first and second plurality of column arrays are alternately in arranged horizontally spaced rows. The plurality of column selectors are divided into a first group of column selectors and a second group of column selectors, wherein the first group is disposed on a first side of the APS array and the second group is disposed on a second side of the APS array. The first and second groups of column selectors are connected to the column arrays. The analog-digital converters are respectively connected to the column selectors and convert pixel data output from the column selectors into digital data. The signal processor receives pixel data output from the analog-digital converters, sums up at least one pixel data representing the same color, and outputs the summed data in response to an output mode.

Preferably, the signal processor includes a multiplexer, an adder, and a controller connected to the multiplexer and the adder. The multiplexer receives a plurality of data streams of the pixel data and combines them into one data stream. The adder sums up pixel data and outputs one data value. When the output mode is a still image mode, the controller transmits the pixel data output from the analog-digital converters to the multiplexer. When the output mode is a moving image mode, the controller simultaneously transmits data of neighboring two pixels having the same color to the adder.

Preferably, column selectors disposed opposite to each other respectively select different column arrays.

Preferably, the color image sensing device further includes output amplifiers, wherein each of which amplifies pixel data output from the pixels, and a plurality of vertical transfer lines transferring pixel data output from the output amplifiers to the column selectors. Preferably, every four vertically continuous pixels in each column array are connected to one of the respective output amplifiers.

Preferably, the color image sensing device further includes the first and second column buffers. The first column buffer temporarily stores pixel data output from the analog-digital converters and transfers the stored pixel data to the signal processor in a predetermined order. The second column buffer temporarily stores pixel data output from the analog-digital converters and transfers the stored pixel data to the signal processor in a predetermined order.

According to another aspect of the present invention, there is provided a pixel data reading method of a color image sensing device having an APS array in which red pixels, green pixels and blue pixels are arranged in a Bayer pattern. The method includes: summing up data of first pixel pairs having the same color, wherein each first pixel pair is disposed in a predetermined column and arranged vertically adjacent to each other, reading the summed data, transmitting the read data to a predetermined channel, summing up data of second pixel pairs each being disposed in another column adjacent to the predetermined column, vertically adjacent to each other and horizontally adjacent to the first pixel pairs, reading the summed data, and transmitting the read data to a second channel different than the predetermined channel; converting the pixel data transmitted to the predetermined channel and the pixel data transmitted to the second channel, respectively; and summing up the digital data.

Preferably, summing up data of first pixel pairs having the same color further includes amplifying the data read from the first pixel pairs to transmit the amplified data to the predetermined channel, and amplifying the data read from the second pixel pairs to transmit the amplified data to the second channel.

Preferably, summing up data of first pixel pairs having the same color is performed on all the pixels of the APS array.

BRIEF DESCRIPTION OF THE DRAWINGS

The present invention will become more apparent to those of ordinary skill in the art when descriptions of exemplary embodiments thereof are read with reference to the accompanying drawings, of which.

DETAILED DESCRIPTION OF EXEMPLARY EMBODIMENTS

Figure 1:
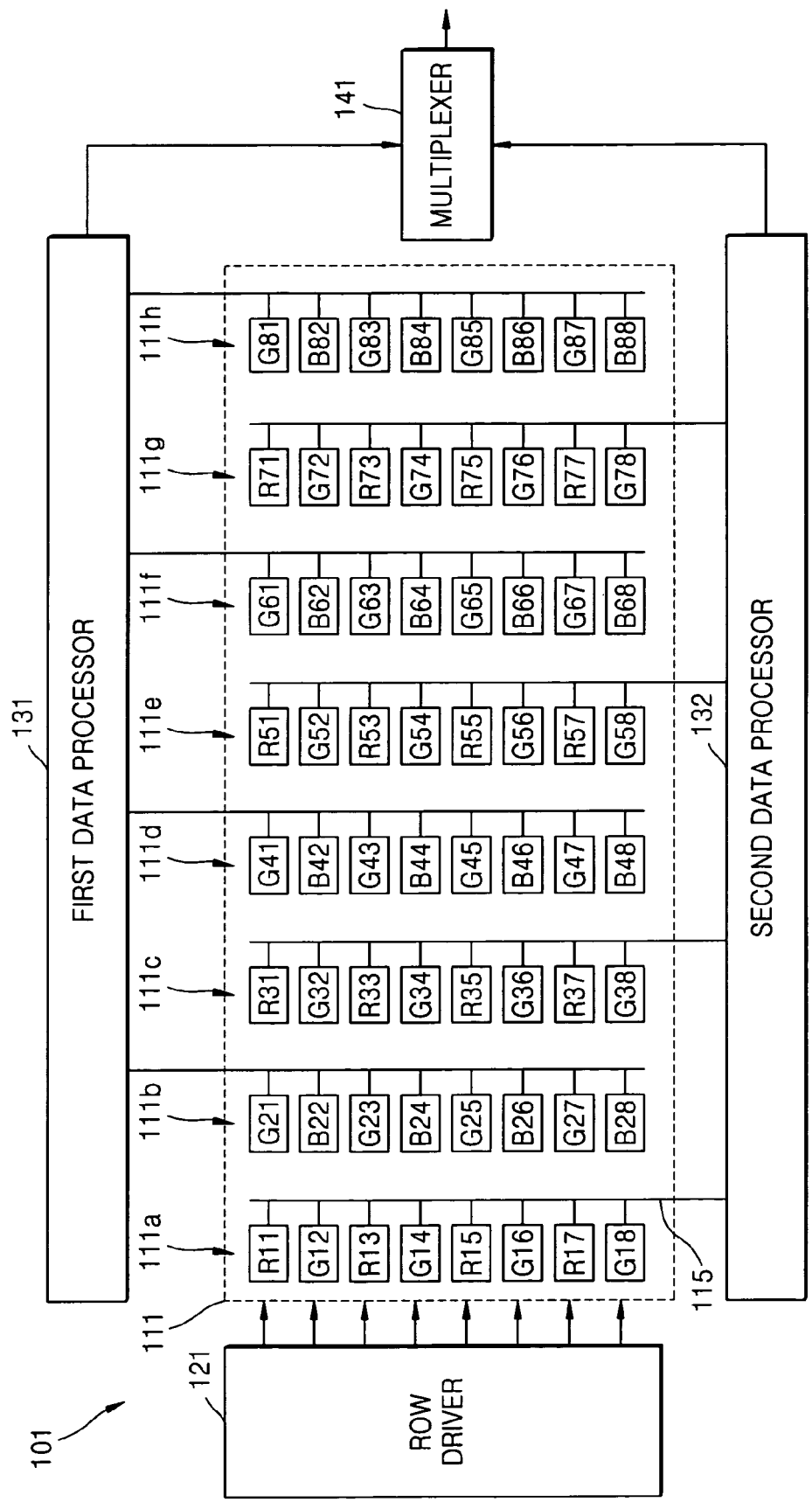
FIG. 1 is a block diagram of a conventional color image sensing device.
Figure 2:
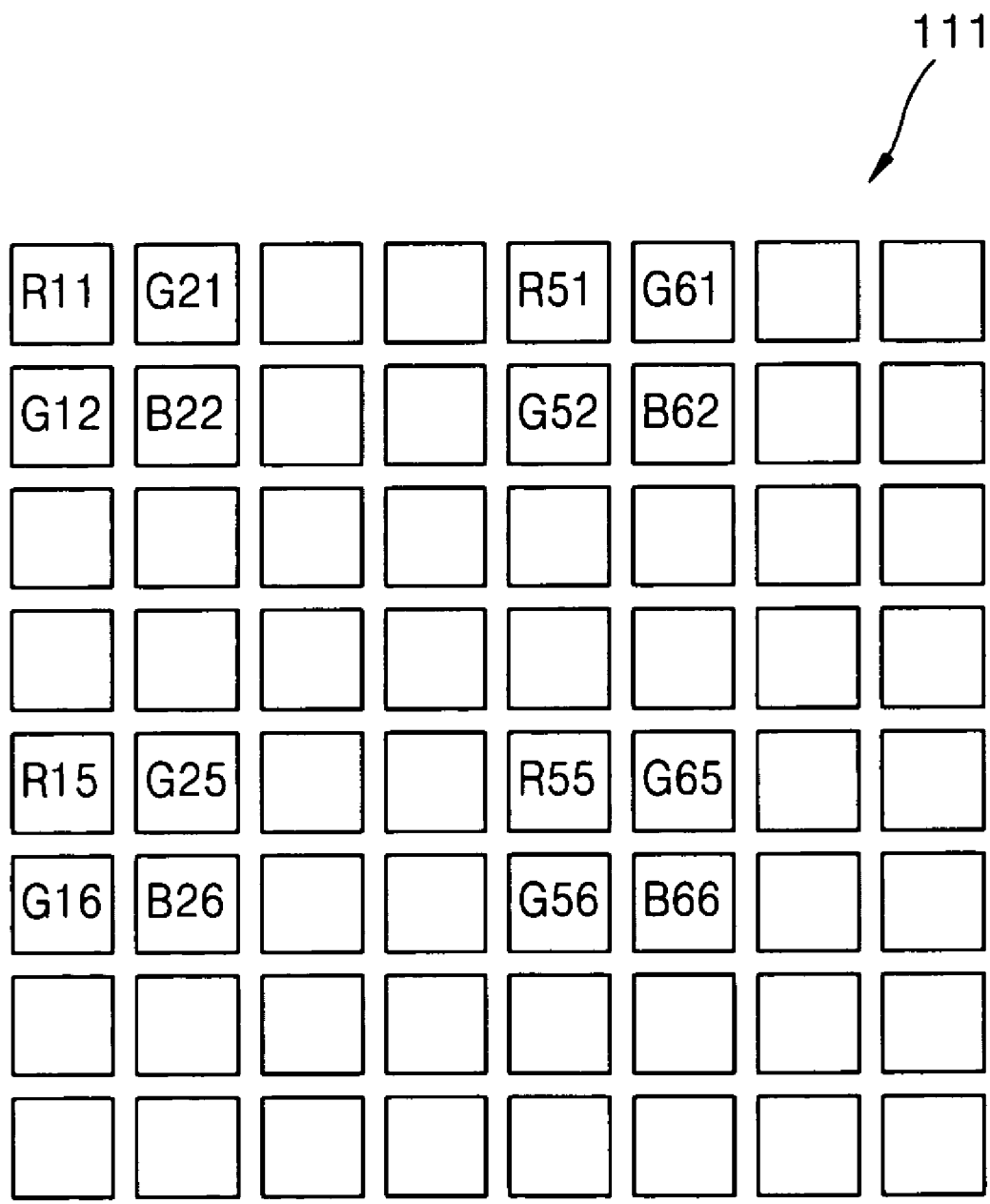
FIG. 2 illustrates an arrangement of pixels from which data is output when the color image sensing device of FIG. 1 is operated in a moving image mode.

Hereinafter, the exemplary embodiments of the present invention will be described in detail with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals refer to similar or identical elements throughout the description of the figures.

Figure 3:
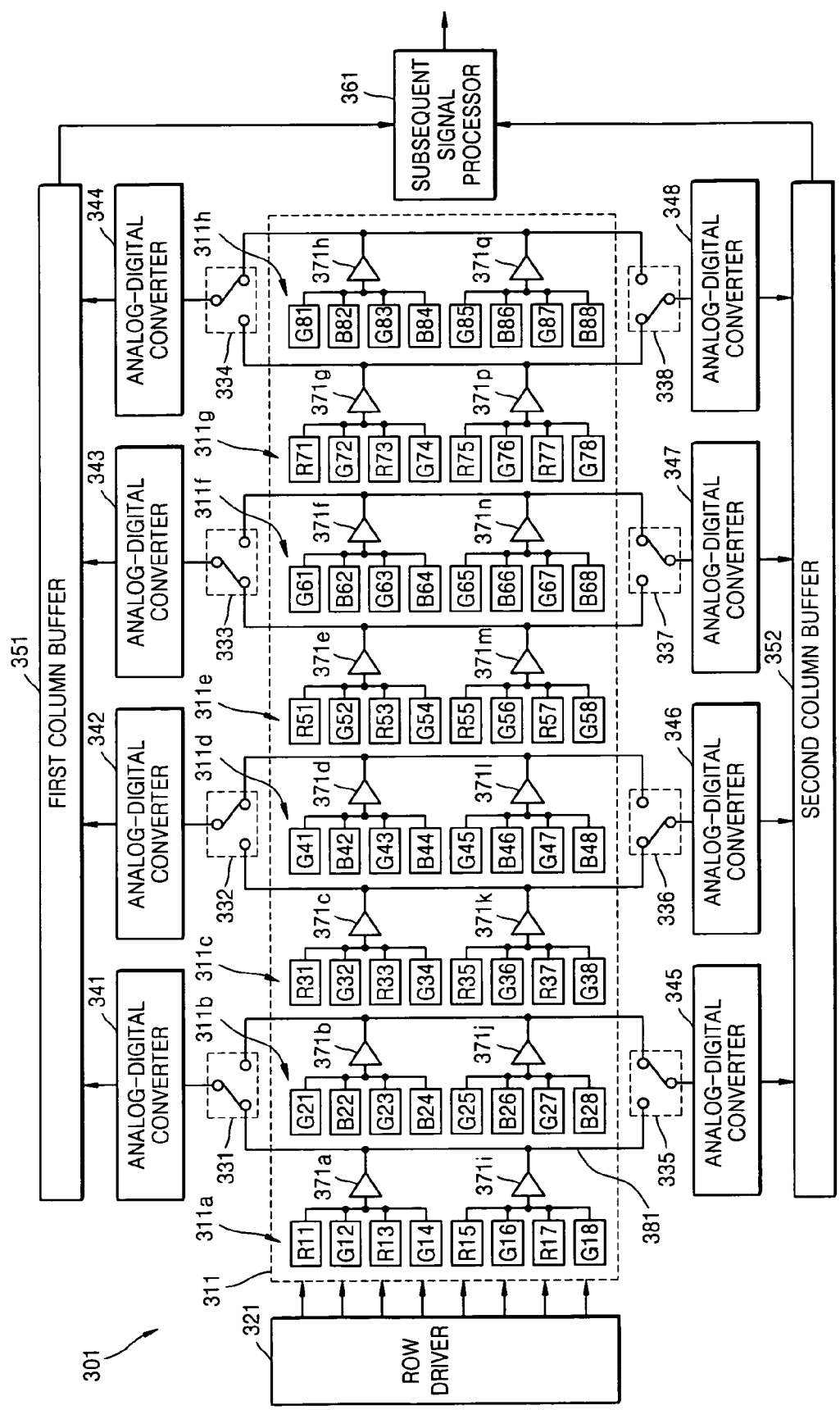
FIG. 3 is a block diagram of a color image sensing device according to an exemplary embodiment of the present invention.

FIG. 3 is a block diagram of a color image sensing device 301 according to an exemplary embodiment of the present invention. Referring to FIG. 3, the color image sensing device 301 includes an APS array 311, a row driver 321, a plurality of column selectors 331 through 338, a plurality of analog-digital converters 341 through 348, first and second column buffers 351 and 352, and a signal processor 361.

The APS array 311 includes the pixels R11 through B88, a plurality of column selectors 311a through 311h, and a plurality of amplifiers 371a through 371q. The APS array 311 includes a first plurality of column arrays 311a, 311c, 311e and 311g in which a plurality of red pixels and a plurality of green pixels are alternately arranged in vertically spaced columns, and a second plurality of column arrays 311b, 311d, 311f and 311h in which a plurality of green pixels and a plurality of blue pixels are alternately arranged in vertically spaced columns. The column arrays 311a, 311c, 311e and 311g and the column arrays 311b, 311d, 311f and 311h are alternately arranged in horizontally spaced rows.

The APS array 311 includes the pixels R11 through G88, a plurality of column selectors 311a through 311h, and a plurality of amplifiers 371a through 371q. The APS array 311 includes a first plurality of column arrays 311a, 311c, 311e and 311g in which a plurality of red pixels and a plurality of green pixels are alternately arranged in vertically spaced columns, and a second plurality of column arrays 311b, 311d, 311f and 311h in which a plurality of green pixels and a plurality of blue pixels are alternately arranged in vertically spaced columns. The column arrays 311a, 311c, 311e and 311g and the column arrays 311b, 311d, 311f and 311h are alternately arranged in horizontally spaced rows.

Red filters are respectively disposed on the plurality of red pixels, green filters are respectively disposed on the plurality of green pixels, and blue filters are respectively disposed on the plurality of blue pixels. In one embodiment of the present invention, the APS array 311 is arranged in a Bayer pattern.

The amplifiers 371a through 371q are connected to the pixels R11 through G88 and amplify data output from the pixels R11 through G88. Every four vertically continuous pixels in each column array are connected to one of the respective amplifiers 371a through 371q. Accordingly, each amplifier can amplify data output from four pixels. An exemplary configuration of the amplifiers 371a through 371q will be described later in this disclosure with reference to FIG. 4.

Pixel data output from the amplifiers 371a through 371q is transmitted via a plurality of vertical transfer lines 381 to the column selectors 331 through 338. The column selectors 331 through 338 are divided into a first group and a second group. The first group of column selectors is disposed on a first side of the APS array 311, and the second group of column selectors is disposed on a second side of the APS array 311. Each column selector is connected to two column arrays and selects one of them. In one embodiment of the present invention, column selectors disposed opposite to each other respectively select different column arrays. For example, when the column selector 331 selects the first column array 311a, the column selector 335 disposed opposite to the column selector 331 selects the second column array 331b, and vice versa. That is, column selectors disposed opposite to each other do not each select the same column array at the same time. Each of the column selectors 331 through 338 is composed of a switching element.

The analog-digital converters 341 through 348 are respectively connected to the column selectors 331 through 338 and convert the pixel data output from the column selectors 331 through 338 into digital data. According to one embodiment of the present invention, the analog-digital converters 341, 342, 343 and 344 are disposed on a first side of the APS array 311, and the analog-digital converters 345, 346, 347 and 348 are disposed on a second side of the APS array 311.

The first column buffer 351 receives pixel data output from the analog-digital converters 341, 342, 343 and 344 and transfers the pixel data to the signal processor 361 in a predetermined order. For example, the first column buffer 351 sequentially outputs data R11+R13 read from the first column array 311a, data G41+G43 read from the fourth column array 311d, data R51+R53 read from the fifth column array 311e, and data G81+G83 read from the eighth column array 311h. When the pixel data of the first, fourth, fifth and eighth column arrays is output in this order, the pixel data of the second, third, sixth and seventh column arrays is read in the same manner.

The second column buffer 352 receives pixel data output from the analog-digital converters 345, 346, 347 and 348 and transfers the pixel data to the signal processor 361 in a predetermined order. For example, the second column buffer 352 sequentially outputs data R31+R33 read from the third column array 311c, data G21+G23 read from the second column array 311b, data R71+R73 read from the seventh column array 311g, and data G61+G63 read from the sixth column array 311f. When the pixel data of the second, third, seventh and sixth column arrays are output in this order, the pixel data of the first, fourth, fifth, seventh and eighth column array is read in the same order.

The signal processor 361 receives digital data transmitted from the first and second column buffers 351 and 352 and sums up at least one pixel data representing the same color in response to an output mode. The signal processor 361 will be described later in this disclosure with reference to FIG. 7.

Figure 4:
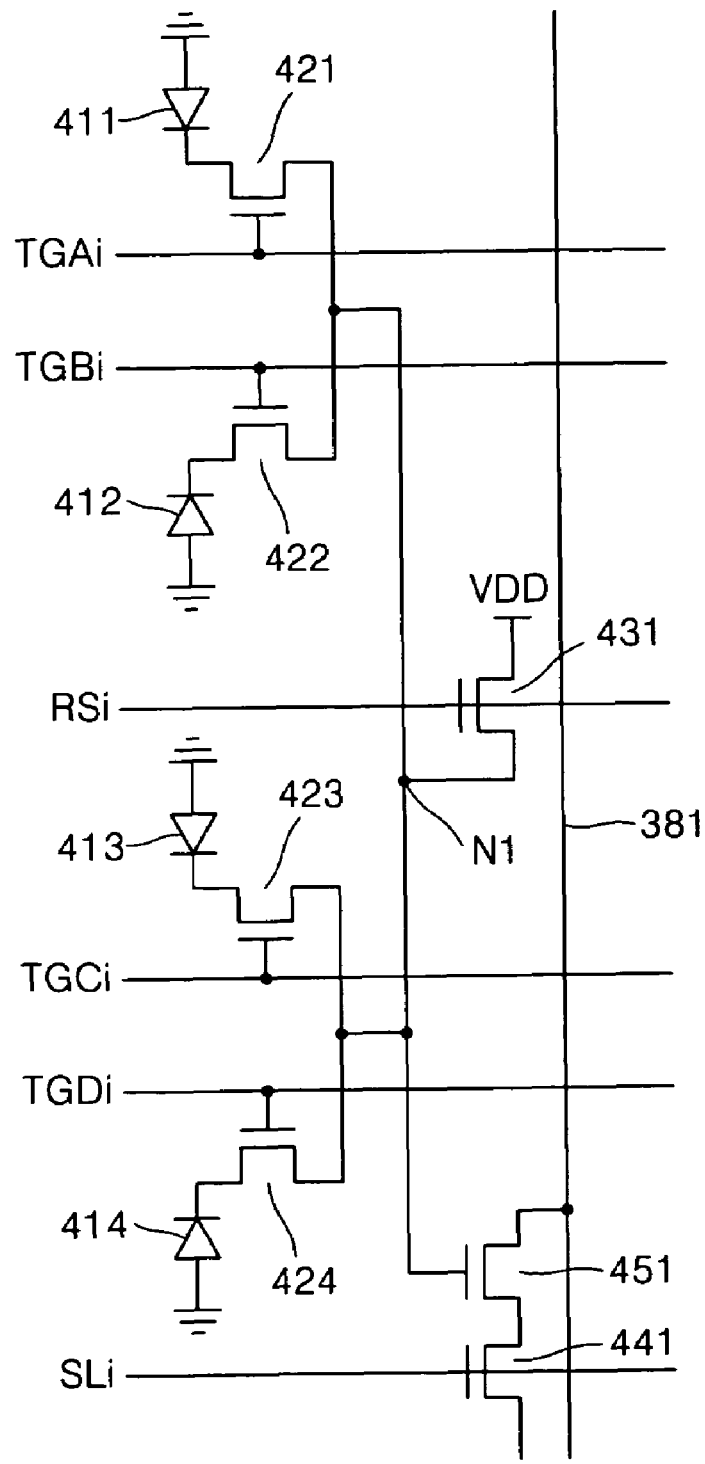
FIG. 4 is a circuit diagram showing a portion of the APS array shown in FIG. 3.

FIG. 4 is a circuit diagram showing a portion of the APS array shown in FIG. 3. In particular, FIG. 4 illustrates four pixels included in one column array and amplifiers connected to the pixels. The exemplary configuration shown in FIG. 4 includes four photo-diodes 411, 412, 413 and 414, four transfer transistors 421, 422, 423 and 424, a reset transistor 431, a select transistor 441, and an amplification transistor 451.

The photo-diodes 411, 412, 413 and 414 convert optical signals into electric signals and store the electric signals. The amplification transistor 451 shown in FIG. 4 serves as an amplifier (371a in FIG. 3). Preferably, the transfer transistors 421, 422, 423 and 424, the reset transistor 431, the select transistor 441 and the amplification transistor 451 are respectively composed of NMOS transistors.

To read data stored in the photo-diodes 411, 412, 413 and 414, a reset signal RSi and a select signal SLi are activated into a logic high level. Then, the reset transistor 431 is turned on to apply a power supply voltage VDD to a node N1, and the select transistor 441 is turned on to apply the power supply voltage VDD to the drain of the amplification transistor 451. In this state, driving signals TGAi, TGBi, TGCi and TGDi are activated into a logic high level, the data stored in the photo-diodes 411, 412, 413 and 414 and the voltage of the node Ni are summed up and applied to the gate of the amplification transistor 451. The amplification transistor 451 amplifies the signal input thereto and transfers the amplified signal to the vertical transfer line 381.

The data stored in the photo-diodes 411, 412, 413 and 414 is read in response to whether the driving signals TGAi, TGBi, TGCi and TGDi are activated or not. The activation of the driving signals TGAi, TGBi, TGCi and TGDi is determined based on the output mode of the color image sensing device (301 in FIG. 3).

Figure 5:
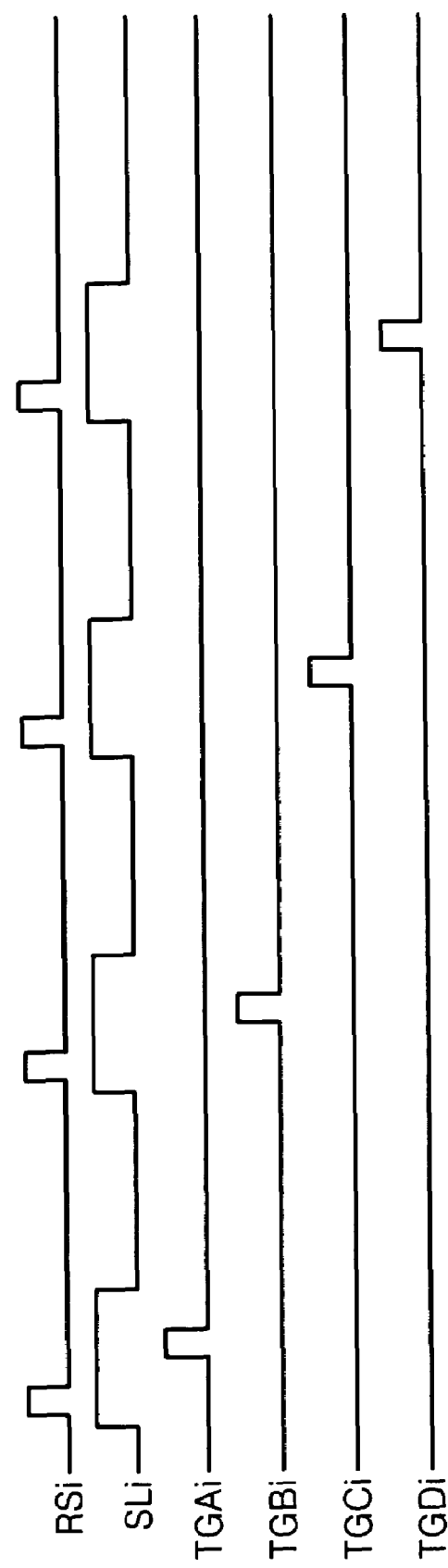
FIG. 5 is a timing diagram for the signals shown in FIG. 4, which are transmitted when the color image sensing device of FIG. 3 is operated in a still image mode.

When the output mode of the color image sensing device (301 in FIG. 3) is a still image mode, the driving signals TGAi, TGBi, TGCi and TGDi are sequentially activated, as shown in FIG. 5. After the pixels are addressed, the transfer transistors 421, 422, 423 and 424 are sequentially turned on, and the data stored in the photo-diodes 411, 412, 413 and 414 are sequentially read.

Figure 6:
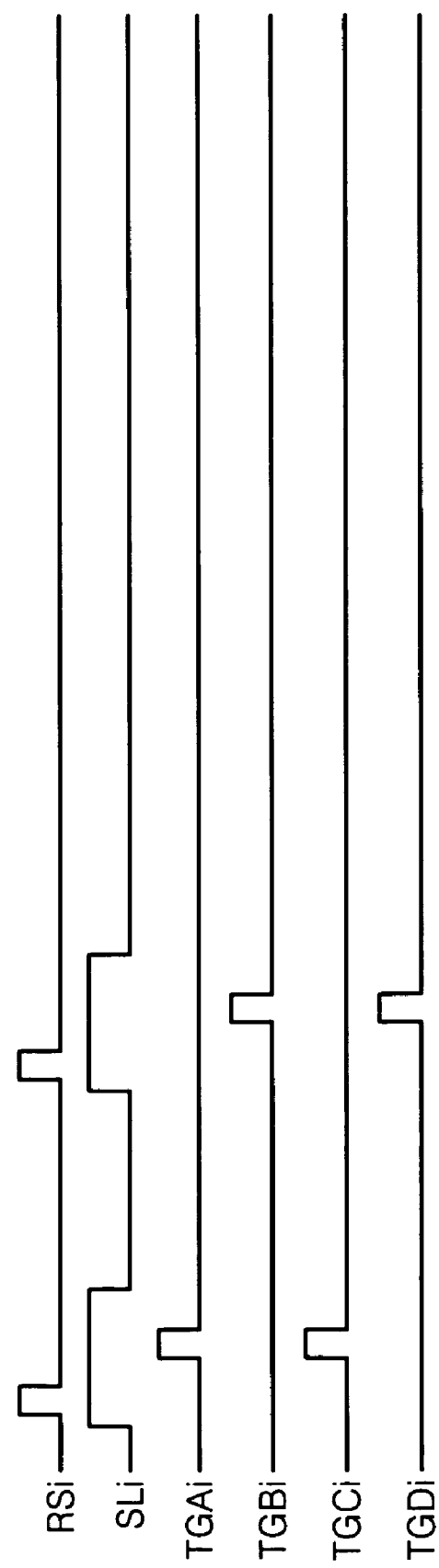
FIG. 6 is a timing diagram for the signals shown in FIG. 4, which are transmitted when the color image sensing device of FIG. 3 is operated in the moving image mode.

FIG. 6 is a timing diagram for the signals shown in FIG. 4, which are transmitted when the color image sensing device of FIG. 3 is operated in the moving image mode. Referring to FIG. 6, when the output mode of the color image sensing device (301 in FIG. 3) is the moving image mode, the driving signals TGAi, TGBi, TGCi and TGDi are sequentially activated two by two. For example, the first and third driving signal TGAi and TGCi are simultaneously activated and then the second and fourth driving signals TGBi and TGDi are simultaneously activated. Then, the first and third transfer transistors 421 and 423 are simultaneously turned on, and thus data stored in the first and third photo-diodes 411 and 413 are read, added to the voltage of the node NI and transmitted to the amplification transistor 451. Subsequently, the second and fourth transfer transistors 422 and 424 are simultaneously turned on, and thus data stored in the second and fourth photo-diodes 412 and 414 are read, added to the voltage of the node NI and transferred to the amplification transistor 451.

Figure 7:
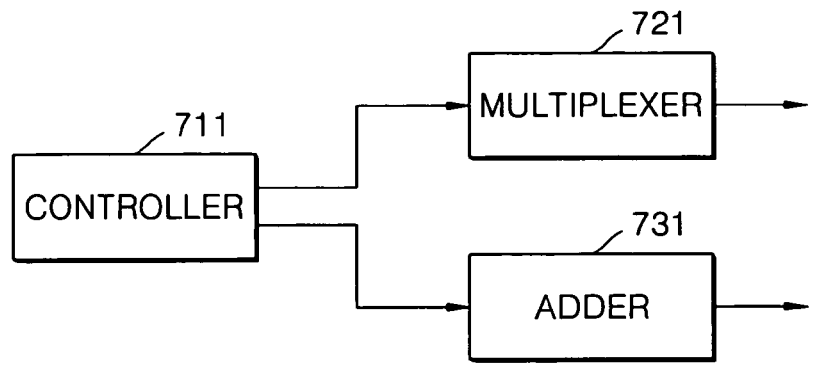
FIG. 7 is a block diagram of the signal processor shown in FIG. 3.
Figure 8A:
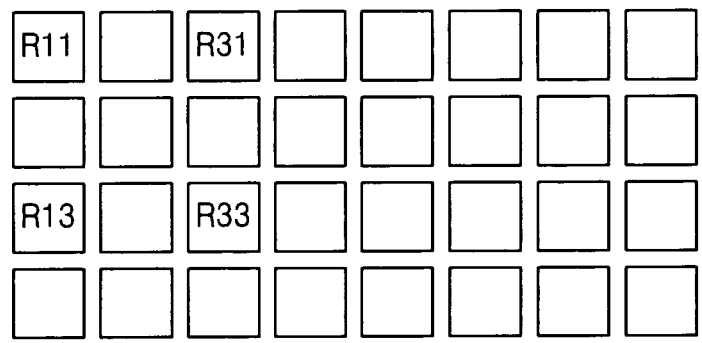
FIGS. 8A through 8H show a sequence of reading data of pixels when the color image sensing device of FIG. 3 is operated in the moving image mode.
Figure 8B:
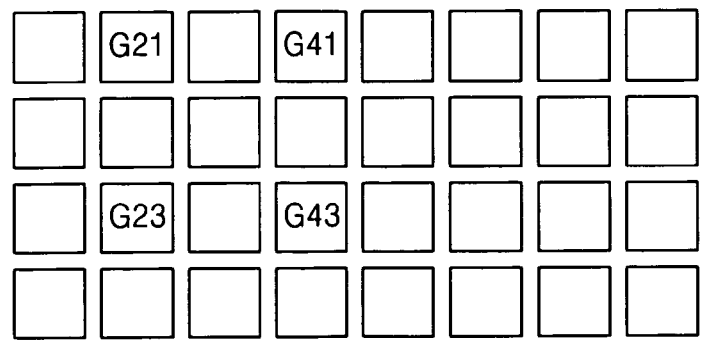
Figure 8C:
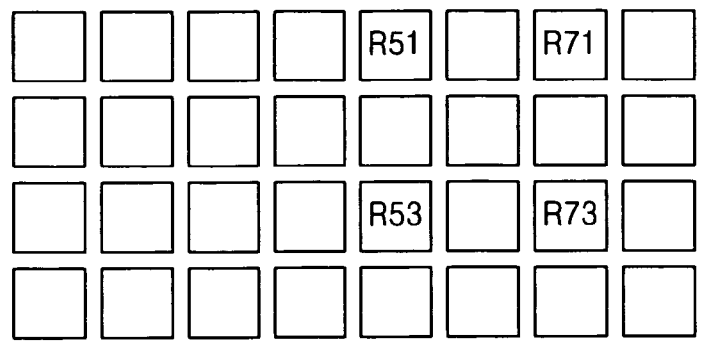
Figure 8D:
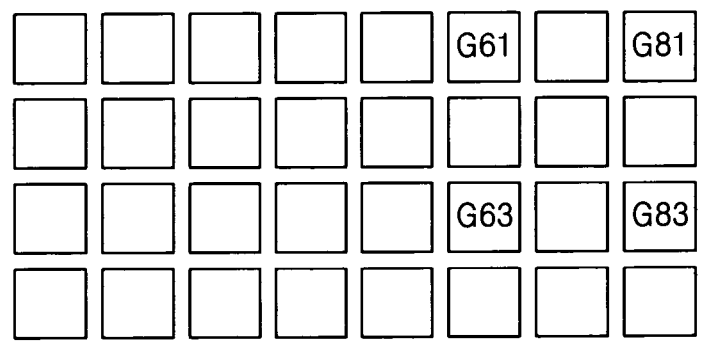
Figure 8E:
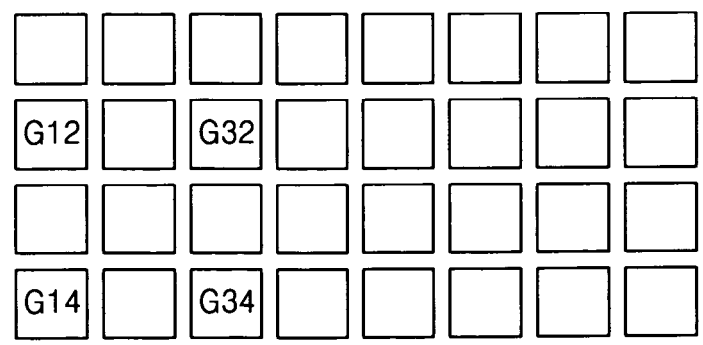
Figure 8F:
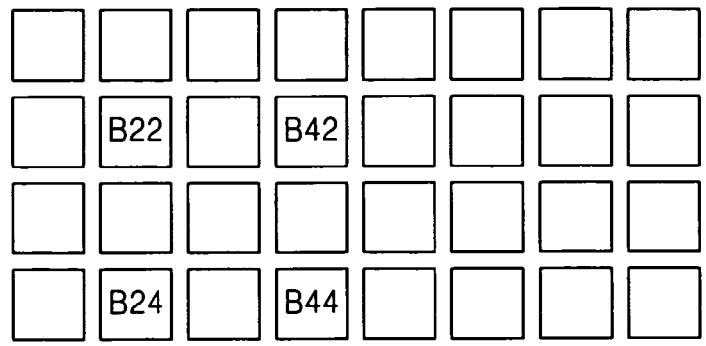
Figure 8G:
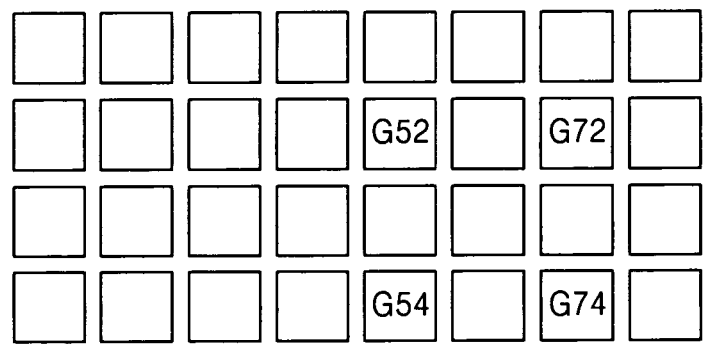
Figure 8H:
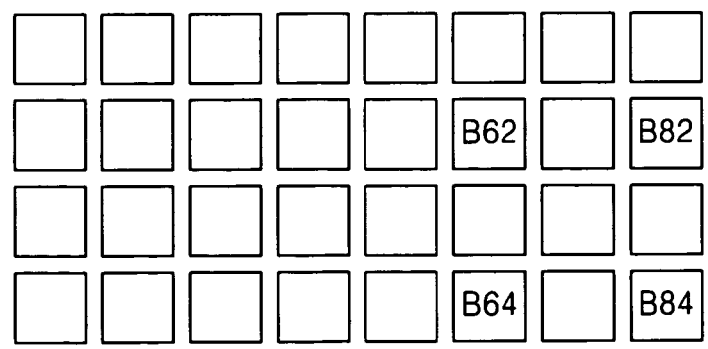

FIG. 7 is a block diagram of the signal processor 361 shown in FIG. 3. Referring to FIG. 7, the signal processor includes a controller 711, a multiplexer 721 and an adder 731. The multiplexer 721 sequentially outputs data transmitted from the controller 711. For example, the multiplexer 721 sequentially outputs the data R11, G21, R31, G41, R51, G61, R71 and G81 of the first row, and sequentially outputs data of the second through eighth rows in the same manner.

The adder 731 shown in FIG. 7 sums up the data transmitted from the controller 711 and outputs one data value. For example, the adder 731 sums up data R11+R13 of red pixels vertically adjacent to each other in the first column (311a in FIG. 3) and outputs the summed data, and then sums up data G21+G23 of green pixels vertically adjacent to each other in the second column (311b in FIG. 3) and outputs the summed data. Subsequently, the adder 731 sums up data G41+G43 of green pixels vertically adjacent to each other in the fourth column (311d in FIG. 3) and outputs the summed data. In this manner, the adder 731 sequentially sums up data of all the pixels of the first and third columns, data of all the pixels of the second and fourth columns, data of all the pixels of the fifth and seventh columns, and data of all the pixel of the sixth and eighth columns.

As shown in FIG. 3, the controller 711 receives data transmitted from the column buffers 351 and 352. The controller 711 transmits the received data to the multiplexer 721 when the output mode of the color image sensing device 301 is the still image mode. When the output mode of the color image sensing device 301 is the moving image mode, the controller 711 simultaneously transmits data of neighboring two pixels having the same color among data input thereto to the adder 731.

FIGS. 8A through 8H show a sequence of reading data of pixels when the color image sensing device of FIG. 3 is operated in the moving image mode. Referring to FIGS. 8A through 8H, data of neighboring four pixels having the same color are summed up and read. In accordance with embodiments of the present invention, resolution is reduced to 25%, and data of all the pixels is read to decrease aliasing noise and improve the S/N ratio.

When the data of all the pixels is output using a conventional method, the S/N ratio SN1 is represented as:

$$SN1 = \frac{Spd}{(Npd^2 + Ntc^2)^{\frac{1}{2}}} \quad \text{[Equation 1]}$$

In Equation 1, Spd represents the quantity of signal output from a light-receiving unit (a device receiving data of the signal processor) when data of one pixel is output. Npd denotes a noise generated from the light-receiving unit. Ntc is a noise generated between analog-digital converters corresponding to one pixel.

When the data of all the pixels is output according to an embodiment of the present invention, the S/N ratio SN2 can be represented as:

$$SN2 = \frac{4Spd}{(4Npd^2 + 2Ntc^2)^{\frac{1}{2}}} \quad \text{[Equation 2]}$$

Figure 9:
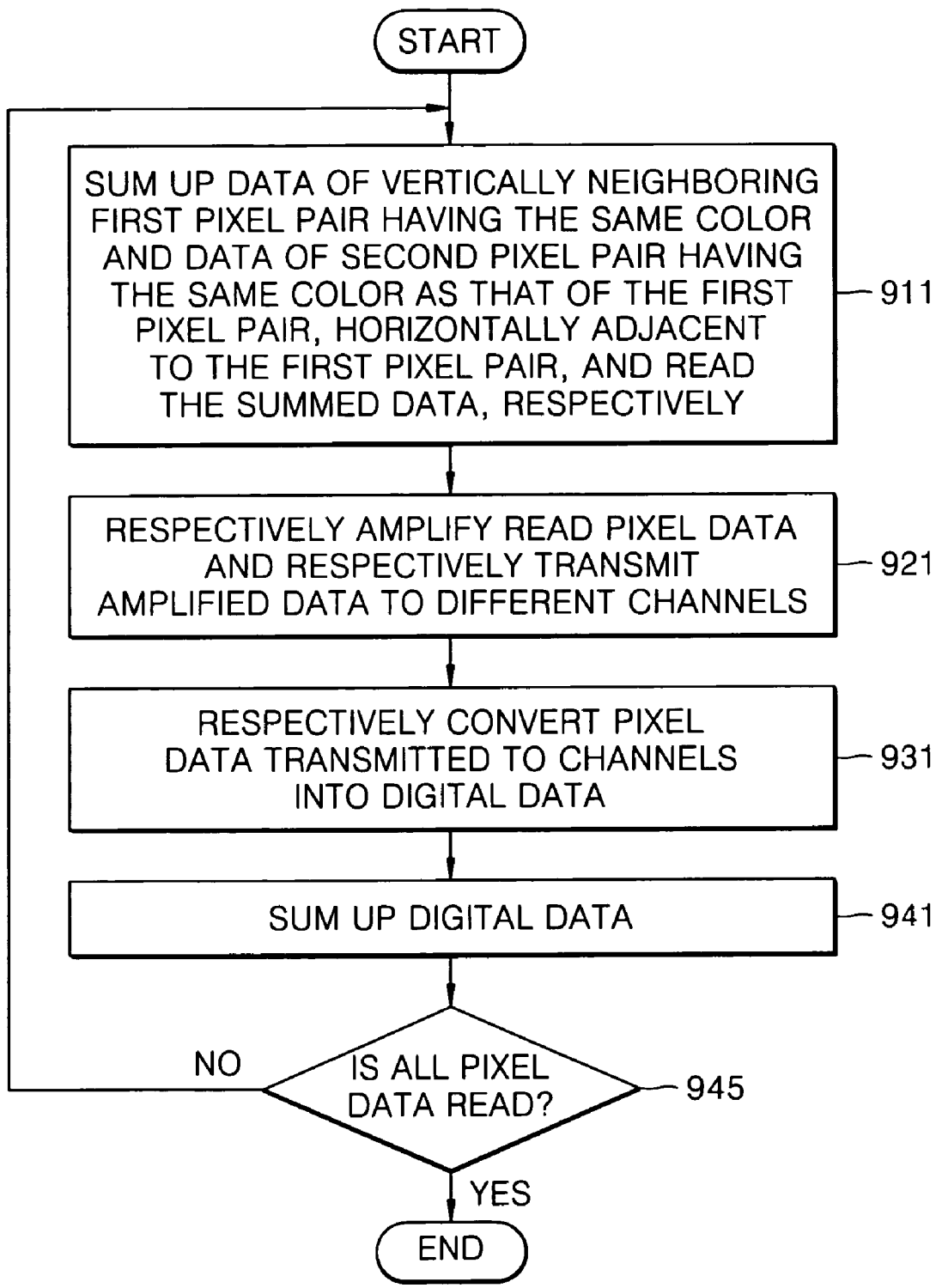
FIG. 9 is a flow chart showing a pixel data reading method of the color image sensing device according to an exemplary embodiment of the present invention.

Npd<<Ntc when the color image sensing device is operated with low-illumination, according to embodiments of the present invention, and SN2 corresponds to 2.8 times SN1. Npd>>Ntc when the color image-sensing device is operated at a high temperature, according to embodiments of the present invention, and SN2 becomes twice SN1. FIG. 9 is a flow chart showing a pixel data reading method of the color image sensing device according to an exemplary embodiment of the present invention. The pixel data reading method of FIG. 9 is applied when the color image sensing device (301 in FIG. 3) is operated in the moving image mode. Hereinafter, the pixel data reading method will be described in detail with reference to FIGS. 3 and 9.

Referring to FIG. 9, in a step 911, data of a first pair of pixels having the same color is summed up and read and data of a second pair of pixels having the same color as that of the first pixel pair is summed up and read, wherein the first pair of pixels are disposed vertically adjacent to each other in a predetermined column, and wherein the second pair of pixels are disposed vertically adjacent to each other in a column adjacent to the predetermined column and horizontally adjacent to the first pixel pair. The step 911 process is performed on all the pixels of the APS array 311.

In a step 921, the data output from the first pixel pair is amplified and transmitted to a predetermined channel, e.g., the analog-digital converters 341, 342, 343 and 344 disposed on a first side of the APS array 311. The data output from the second pixel pair is amplified and transmitted to another channel, e.g., the analog-digital converters 345, 346, 347 and 348 disposed on a second side of the APS array 311.

In a step 931, the pixel data transmitted to the predetermined channel and the pixel data transmitted to another channel are respectively converted into digital data. In a step 941, the digital data is summed up.

The above-described process is repeated until all the pixels of the APS array 311 are read.

As described above, the color image sensing device, according to embodiments of the present invention, is capable of summing up data of vertically and horizontally neighboring four pixels having the same color from among the pixels of the APS array and outputting the summed data when the color image sensing device is operated in the moving image mode to read data of all the pixels to improve the S/N ratio.

According to embodiments of the present invention when data of vertically neighboring pixels having the same color is summed up and read, the data is read through different channels such that pixel data representing the same color does not generate interference and reduces aliasing noise. The data of vertically neighboring pixels having the same color is summed up a first time and then summed up by the signal processor, and thus a separate data summing unit following the signal processor is not needed. Accordingly, the pixel data reading time is reduced and the manufacturing cost of the color image sensing device is decreased.

Although the processes and apparatus of the present invention have been described in detail with reference to the accompanying drawings for the purpose of illustration, it will be understood that the inventive processes and apparatus are not to be construed as limited thereby. It will be readily apparent to those of reasonable skill in the art that various modifications to the foregoing exemplary embodiments may be made without departing from the scope of the invention as defined by the appended claims.

What is claimed is:

1. A color image sensing device comprising:
   an active pixel sensor (APS) array including a first plurality of column arrays in which a first plurality of red pixels and a first plurality of green pixels are alternately arranged in vertically spaced columns and a second plurality of column arrays in which a second plurality of green pixels and a second plurality of blue pixels are alternately arranged in vertically spaced columns, wherein the first and second column arrays are alternately arranged in horizontally spaced rows;
   a plurality of column selectors connected to the column arrays, wherein the column selectors are divided into a first group and a second group, wherein the first group is disposed on a first side of the APS array and the second group is disposed on a second side of the APS array;
   a plurality of analog-digital converters respectively connected to the column selectors to convert pixel data output from the column selectors into digital data; and
   a signal processor receiving pixel data output from the analog-digital converters and summing up at least one pixel data representing the same color and outputting the summed data in response to an output mode,
   wherein when the output mode is a moving image mode, data of a first pixel pair having the same color is summed up and data of a second pixel pair neighboring the first pixel pair and having the same color as the first pixel pair is summed up, and then, the summed up data of the first pixel pair and the summed up data of the second pixel pair are summed up by the signal processor.

2. The color image sensing device of claim 1, wherein the signal processor comprises:
   a multiplexer receiving a plurality of data streams of the pixel data and combining them into one data stream;
   an adder summing up pixel data and outputting one data value; and
   a controller connected to the multiplexer and the adder, wherein the controller transmits the pixel data output from the analog-digital converters to the multiplexer when the output mode is a still image mode, and wherein the controller simultaneously transmits data of neighboring two pixels having the same color to the adder when the output mode is the moving image mode.

3. The color image sensing device of claim 1, wherein column selectors disposed opposite to each other respectively select different column arrays.

4. The color image sensing device of claim 1, further comprising output amplifiers, wherein every four vertically continuous pixels in each column array are connected to one of the respective output amplifiers, and wherein each of the output amplifiers amplifies pixel data output from the pixels.

5. The color image sensing device of claim 4, further comprising a plurality of vertical transfer lines transferring pixel data output from the output amplifiers to the column selectors.

6. The color image sensing device of claim 1, further comprising:
- a first column buffer temporarily storing pixel data output from the analog-digital converters and transferring the stored pixel data to the signal processor in a predetermined order; and
- a second column buffer temporarily storing pixel data output from the analog-digital converters and transferring the stored pixel data to the signal processor in a predetermined order.

7. The color image sensing device of claim 1, wherein the APS array is arranged in a Bayer pattern.

8. A pixel data reading method of a color image sensing device having an APS array in which red pixels, green pixels and blue pixels are arranged in a Bayer pattern, the method comprising:
- summing up data of a first pixel pair having the same color, wherein the first pixel pair is disposed in a first column and both pixels of the first pixel pair are arranged vertically adjacent to each other, reading the summed data, transmitting the read data to a first channel, summing up data of a second pixel pair having the same color as the first pixel pair, wherein the second pixel pair is disposed in a second column adjacent to the first column and both pixels of the second pixel pair are arranged vertically adjacent to each other and horizontally adjacent to both pixels of the first pixel pair, reading the summed data, and transmitting the read data to a second channel;
- converting the pixel data transmitted to the first channel and the pixel data transmitted to the second channel into digital data, respectively; and
- summing up the digital data,
- wherein the data of the first and second pixel pairs and the digital data are summed up in a moving image mode.

9. The pixel data reading method of claim 8, wherein summing up data of first pixel pair having the same color further comprises amplifying the data read from the first pixel pair to transmit the amplified data to the first channel, and amplifying the data read from the second pixel pair to transmit the amplified data to the second channel.

10. The pixel data reading method of claim 8, wherein summing up data of first pixel pair having the same color is performed on all the pixels of the APS array.

* * * * *